Figure 1:
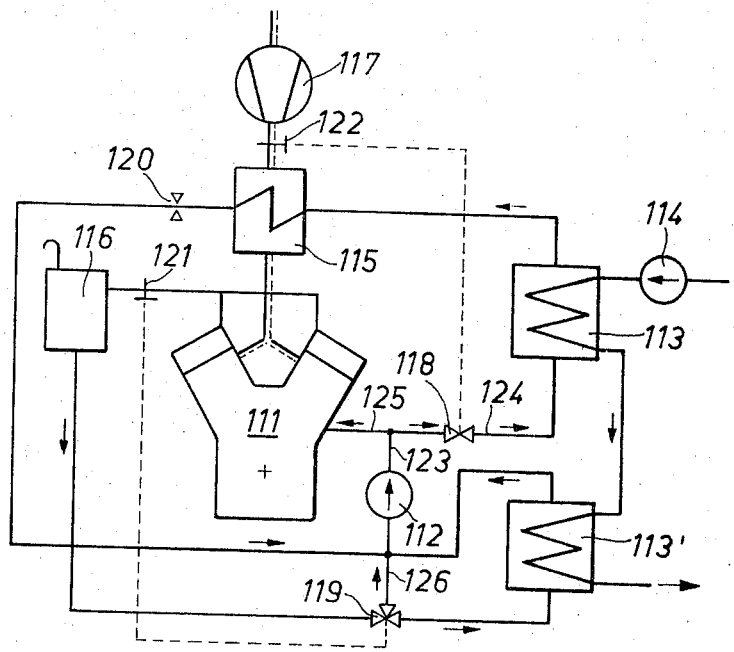

United States Patent [19]
Deutschmann

[11] 3,872,835
[45] Mar. 25, 1975

[54] COOLING WATER CIRCULATION FOR A SUPERCHARGED INTERNAL COMBUSTION PISTON ENGINE

[76] Inventor: Herbert Deutschmann, Konrad-Kummel-Weg 31, Friedrichshafen, Germany

[22] Filed: Sept. 4, 1973

[21] Appl. No.: 394,343

[30] Foreign Application Priority Data
Sept. 15, 1972   Germany.............................. 2245257

[52] U.S. Cl............ 123/41.31, 60/13, 123/119 CD, 123/119 DB
[51] Int. Cl............................. F01p 1/06, F01p 3/12
[58] Field of Search.... 123/41.31, 119 DB, 119 CD; 60/13

[56] References Cited
UNITED STATES PATENTS

| | | | |
|---|---|---|---|
| 2,362,015 | 11/1944 | Lundquist | 123/41.31 |
| 3,134,371 | 5/1964 | Crooks | 123/41.31 |
| 3,229,456 | 1/1966 | Gratzmuller | 123/41.31 |
| 3,397,684 | 8/1968 | Scherenberg | 60/13 |
| 3,425,400 | 2/1969 | Scherenberg | 123/41.31 |
| 3,439,657 | 4/1969 | Gratzmuller | 60/13 |
| 3,442,258 | 5/1969 | Ruger et al. | 123/41.31 |
| 3,444,845 | 5/1969 | Scheiterlein | 123/41.31 |
| 3,483,854 | 12/1969 | Foran | 123/41.31 |
| 3,595,013 | 7/1971 | Brille | 60/13 |

FOREIGN PATENTS OR APPLICATIONS

| | | | |
|---|---|---|---|
| 1,236,246 | 6/1960 | France | 123/41.31 |
| 871,659 | 2/1953 | Germany | 123/41.31 |

*Primary Examiner*—Manuel A. Antonakas
*Assistant Examiner*—Daniel J. O'Connor
*Attorney, Agent, or Firm*—Craig & Antonelli

[57] ABSTRACT

A cooling water circulatory system for a supercharged piston internal combustion engine which is equipped with a cooling water pump, a re-cooler, a feed means for the re-cooling medium, a supercharged air cooler and an expansion tank; the cooling water flow on the pressure side of the cooling water pump is thereby divided into a partial stream for cooling the supercharged air and into a partial stream for cooling the engine whereby these partial streams recombine on the suction side of the cooling water pump after passing through the supercharged air cooler and the engine, respectively; the partial stream for cooling the supercharged air is thereby cooled in the re-cooler prior to entry in the supercharged air cooler and its quantity is limited by a throttling device installed in the cooling water discharge line of the supercharged air cooler; a thermostatic valve opens up a bypass line when the engine is cold whereby a more rapid warm-up of the engine cooling water to the operating temperature is made possible.

19 Claims, 2 Drawing Figures

COOLING WATER CIRCULATION FOR A SUPERCHARGED INTERNAL COMBUSTION PISTON ENGINE

This invention relates to a cooling water circulatory system for a supercharged internal combustion piston engine with a cooling water circulation pump, a re-cooler, a feed installation for the re-cooling medium, a supercharged air cooler, and an expansion tank.

One understands by a supercharged internal combustion piston engine an engine to which is fed precompressed combustion air, so-called supercharged air, in order to increase the power.

The amount of power increase is the larger, the cooler the condition in which the supercharged air reaches the cylinders of the engine. Since the air is heated-up due to the compression, it is necessary to cool the supercharged air.

If in water-cooled engines, for example, also the engine cooling water is utilized for the cooling of the supercharged air, then the engine cooling water cannot, however, be re-cooled as low as desired in order to maintain the proper operating temperature of the engine. For this reason, in engines having such known cooling water circulatory systems, the degree of power increase by supercharging is limited in that only cooling water having the operating temperature of the engine is available for the cooling of the supercharged air.

It is the task of this invention to provide a cooling water circulatory system which makes it possible to operate in the supercharged-air-cooler with cooling water having a lower temperature than the operating temperature of the engine.

This task is solved in accordance with the present invention in that the cooling water flow branches out on the delivery side of the cooling water pump into a partial stream for the supercharged-air-cooling and into a partial stream for the engine cooling, and in that these partial streams are combined again after passing through the supercharged-air-cooler and the engine, respectively, on the suction side of the cooling water pump, whereby the branching off partial stream for the supercharged-air-cooling is cooled in the re-cooler prior to entering the supercharged-air-cooler and the amount thereof is limited by a throttling device in the cooling water outlet line of the supercharged-air-cooler and in that a thermostatic valve opens up a bypass line when the engine is cold, whereby a more rapid warm-up of the engine cooling water to the operating temperature is made possible.

In order for the cooling of the supercharged air to be independent of the operating temperature of the engine, the two partial streams, in accordance with one embodiment of the present invention, are cooled separately from each other in the re-cooler, and only the re-cooler which is traversed by the partial stream for the engine cooling is bypassed when the engine is cold.

The extent of cooling of the supercharged air can be regulated in that in accordance with this embodiment of the invention, the amount of the branching-off partial stream for the supercharged-air-cooling is variable by means of a device and this device is either controlled by dependence on the compressor discharge temperature of the supercharged air, for example, with an engine whose compressor rotational speed and thus also whose compressor discharge temperature varies with the engine load, or, and this holds true for any diesel engine with supercharging, is controlled in dependence on the control-rack position of the injection pump.

Another particularly advantageous embodiment of the present invention resides in that only the partial stream for the supercharged-air-cooling is cooled in the re-cooler, and the cooling of the partial stream for the engine cooling is effected by mixing with the colder partial stream for the supercharged-air-cooling, whereby the quantitative relationship of the two partial streams is so matched that the outlet temperature of the cooling water required for engine cooling results at the outlet of the cooling water pump solely on the basis of the intermixing, and that the re-cooler is bypassed with a cold engine.

According to this invention, water or air can be utilized in the re-cooler as the heat-absorbing medium for the cooling of the partial streams.

The advantages attained by the present invention consist particularly in that, as compared to the conventional cooling of the supercharged air, it is achieved by the improved cooling of the supercharged-air cooling water that, with the same structural size of the supercharged-air-cooler, the supercharged air is cooled more intensively and thereby the engine output can be considerably increased, or that the structural size of the supercharged air cooler can be reduced, with the same engine output and thus with unchanged supercharged air temperature.

Accordingly, it is an object of the present invention to provide a cooling water circulatory system for a supercharged piston-type internal combustion engine which avoids by simple means the aforementioned shortcomings and drawbacks encountered in the prior art.

Another object of the present invention resides in a cooling water circulatory system for a supercharged piston internal combustion engine in which the supercharged air can be cooled to a relatively lower temperature than the operating temperature of the engine.

A further object of the present invention resides in a cooling water circulatory system for a supercharged piston internal combustion engine which is relatively simple in construction, yet permits a more intensive cooling of the supercharged combustion air than in the heretofore customary systems.

Figure 2:
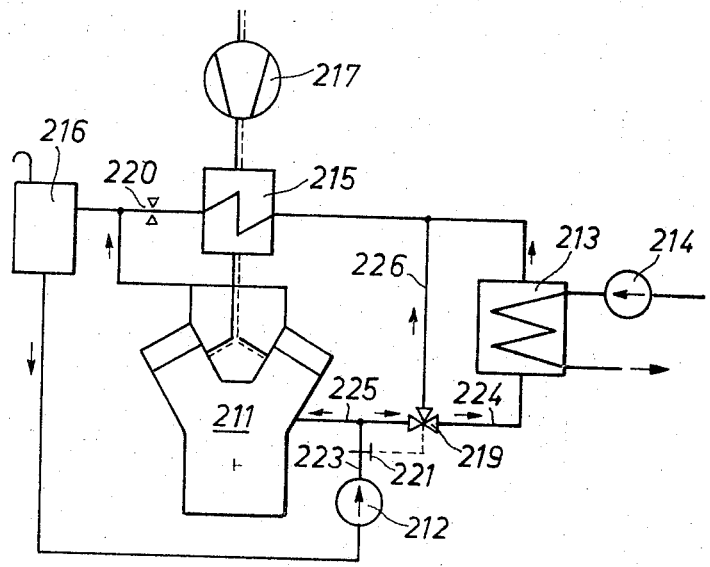

These and other objects, features and advantages of the present invention will become more apparent from the following description when taken in connection with the accompanying drawing which shows, for purposes of illustration only, two embodiments in accordance with the present invention, and wherein:

FIG. 1 is a schematic diagrammatic view of a cooling water circulatory system with re-coolers for the engine cooling water and the supercharged air cooling water in accordance with the present invention; and FIG. 2 is a schematic diagrammatic view of a modified embodiment of a cooling water circulatory system with a re-cooler for the supercharged air cooling-water in accordance with the present invention.

Referring now to the two figures of the drawing wherein like reference numerals of the 100-series and of the 200-series are used to designate corresponding parts in FIGS. 1 and 2, respectively, the two figures illustrate each a cooling water circulatory system of a supercharged internal combustion piston engine, for example, of a diesel engine 111, 211, with a cooling water pump 112, 212, with a re-cooler 113, 213, with a feed device for the re-cooling medium 114, 214, with a supercharged-air-cooler 115, 215, and with an expansion tank 116, 216. The air, compressed and thereby heated by the compressor 117, 217, is cooled in the supercharged-air-cooler 115, 215 before reaching the cylinders of the engine 111, 211.

Furthermore, both cooling water circulatory systems have in common that the cooling water flow 123, 223 on the delivery side of the cooling water pump 112, 212 is branched off into a partial stream 124, 224 for the supercharged-air-cooling and into a partial stream 125, 225 for the engine-cooling, and that these partial streams 124, 224, 125, 225, after passing through the supercharged-air-cooler 115, 215 and the engine 111, 211, respectively, are combined again on the suction side of the cooling water pump 112, 212, whereby the branched-off partial stream 124, 224 for the supercharged-air-cooling is cooled in the re-cooler 113, 213 prior to entering the supercharged-air-cooler 115, 215, and its amount is limited by a throttle device, for example, by an orifice 120, 220 in the cooling water discharge line of the supercharged-air-cooler 115, 215, and that a thermostatic valve 119, 219 opens up a bypass line 126, 226 with a cold engine whereby a faster warm-up of the engine-cooling-water 125, 225 to the operating temperaturee is made possible.

In the cooling water circulatory system of FIG. 1, the partial streams 124 and 125 are cooled separately from each other in the two re-coolers 113 and 113' which, deviating from the illustration in FIG. 1, may also be combined into a single structural unit for purposes of simplification of the line lay-out.

By means of this arrangement, the partial stream 124 for the supercharged-air-cooling can be cooled, independently of the engine cooling water 125, to a lower temperature than the operating temperature of the engine 111, whence also a more intense cooling of the supercharged air is made possible.

With a cold engine, the temperature probe 121 brings about that the thermostatic valve 119 opens up the line 126 and thus the re-cooler 113' is by-passed.

The extent of supercharged-air-cooling can be regulated in the cooling water circulatory system of FIG. 1 in that the amount of the partial stream 124 is variable by means of a device 118. If the control of the supercharged-air-cooling is to take place in dependence on the engine load, then it is possible that this device 118, in case of an engine, whose compressor rotational speed and thus also whose compressor outlet temperature vary with the engine load, consists, for example, of a thermostatic valve which is controlled by a temperature sensor 122 in dependence on the compressor outlet temperature of the supercharged air.

Another possibility to realize the cooling of the supercharged air in dependence on the engine load resides in controlling the device 118 for regulating the partial stream 124 for the supercharged-air-cooling in dependence on the control-rack position of the injection pump.

A substantially more simplified line lay-out results with the cooling water circulatory system according to FIG. 2. In this embodiment, only the branching-off partial stream 224 for the supercharged-air-cooling is cooled in the re-cooler 213, whereby, however, also an intensive cooling of the supercharged air is made possible independently of the operating temperature of the engine 211. Here again, the temperature sensor 221 causes the thermostatic valve 219 to open up the line 226 when the engine is cold and thus the re-cooler 213 is bypassed.

The cooling of the partial stream 225 for the engine cooling takes place in this case by mixing with the colder partial stream 224 for the supercharged-air-cooling, whereby the quantitative relationship of the two partial streams 224, 225 is so adjusted with the aid of the orifice 220 in the outlet line of the supercharged-air-cooler 215 that the temperature of the cooling water 223 which is required for the cooling of the engine, is obtained at the cooling-water pump discharge solely on the basis of the intermixing of the engine cooling water 225, with a warmer after leaving the engine 211, with the supercharged-air cooling-water 224, which is not heated up to the same extent after leaving the supercharged-air-cooler 215.

As symbolically indicated in FIGS. 1 and 2, water is employed as the heat-absorbing medium for cooling the partial streams 124, 224, 125, 225 in the re-coolers 113, 113', 213. However, air can be employed just as well, whereby, of course, a re-cooler 113, 113', 213 adapted to the respective re-cooling medium, and a corresponding feed device 114, 214 has to be used.

As compared to the conventional cooling of the supercharged-air, it is achieved by the improved cooling of the supercharged-air-cooling-water that, with the same structural size of the supercharged air-cooler, the supercharged-air is cooled more intensively and thereby the engine power output can be considerably increased, or, with the engine power output remaining the same and thus with the supercharged-air temperature remaining unchanged, the structural size of the supercharged air-cooler can be reduced.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What is claimed is:

1. In combination with a supercharged piston internal combustion engine, a cooling water circulatory system which includes a cooling water pump, a re-cooler means, a feed means for a re-cooling medium and a supercharged air cooler means, characterized in that the cooling water stream is branched off on the pressure side of the cooling water pump into a first partial stream for cooling the supercharged air and into a second partial stream for cooling the engine, said partial streams recombining after passing through the supercharged air cooler means and the engine, respectively, on the suction side of the cooling water pump, the partial stream for cooling the supercharged air being cooled in the re-cooler means prior to entry in the supercharged air cooler means, a bypass line bypassing at least a part of the re-cooler means, and a thermostatic valve means opening said bypass line with a relatively cold engine whereby a faster warm-up of the engine cooling medium to its operating temperature is made possible.

2. The combination according to claim 1, characterized by throttling means in the cooling water outlet line of the supercharged air cooler means for limiting the quantity of the partial stream for the cooling of the supercharged air.

3. The combination according to claim 2, characterized by an expansion tank means interconnected in the system.

4. The combination according to claim 3, characterized in that the two partial streams are cooled in the re-cooler means separately from one another and in that only the re-cooler means which is traversed by the partial stream for cooling the engine is bypassed by said bypass line with a cold engine.

5. The combination according to claim 4, including a compressor the rotational speed and outlet temperature of which varies with engine load, characterized in that the quantity of the branching-off partial stream for cooling the supercharged air is variable by a control means, said control means being controlled in dependence on the compressor outlet temperature of the supercharged air.

6. The combination according to claim 5, characterized in that said control means is controlled also as a function of the control rack position of an injection pump means.

7. The combination according to claim 6, characterized in that water is used as heat-absorbing medium for the cooling of the partial streams in the re-cooler means.

8. The combination according to claim 6, characterized in that air is used as heat-absorbing medium for the cooling of the partial streams in the re-cooler means.

9. The combination according to claim 3, characterized in that only the partial stream for cooling the supercharged air is cooled in the re-cooler means, the cooling of the partial stream for cooling the engine taking place by mixing with the colder partial stream for cooling the supercharged air.

10. The combination according to claim 9, characterized by means for so matching the quantity relationship of the two parrial streams that the outlet temperature of the cooling water at the cooling water pump discharge results exclusively by reason of the mixing action, and means for bypassing the re-cooler means with a cold engine.

11. The combination according to claim 10, characterized in that water is used as heat-absorbing medium for the cooling of the partial streams in the re-cooler means.

12. The combination according to claim 10, characterized in that air is used as heat-absorbing medium for cooling the partial streams in the re-cooler means.

13. The combination according to claim 1, characterized in that the two partial streams are cooled separately from one another in the re-cooler means, and in that only the re-cooler means traversed by the partial stream for cooling the engine is by-passed with a cold engine.

14. The combination according to claim 1, including a compressor the rotational speed and outlet temperature of which varies with engine load, characterized by control means for controlling the quantity of the branching-off partial stream for cooling the supercharged air which is controlled in dependence on the compressor outlet temperature of the supercharged air.

15. The combination according to claim 1, characterized by control means for controlling the quantity of the branching-off partial stream for cooling the supercharged air in dependence on the position of the control rack of an injection pump.

16. The combination according to claim 1, characterized in that only the partial stream for cooling the supercharged air is being cooled in the re-cooler means, the cooling of the partial stream for the engine cooling taking place by mixing with the colder partial stream for the supercharged air cooling.

17. The combination according to claim 16, characterized by means for so matching the quantity relationship of the two partial streams that the outlet temperature of the cooling water at the cooling water pump discharge, which is necessary for the engine cooling, results substantially exclusively on the basis of the mixing action, and in that the re-cooler means is bypassed with a cold engine.

18. The combination according to claim 1, characterized in that water is used as heat-absorbing medium for cooling the partial streams in the re-cooler means.

19. The combination according to claim 1, characterized in that air is used as heat-absorbing medium for cooling the partial streams in the re-cooler means.

* * * * *

UNITED STATES PATENT OFFICE
CERTIFICATE OF CORRECTION

Patent No. 3,872,835      Dated March 25, 1975

Inventor(s) Herbert Deutschmann

It is certified that error appears in the above-identified patent and that said Letters Patent are hereby corrected as shown below:

Title page, insert the following:

[73]      Assignee: Motoren-und Turbinen-Union
Friedrichshafen GmbH,
Stuttgart, Germany Signed and Sealed this seventh Day of October 1975

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,872,835      Dated March 25, 1975

Inventor(s) Herbert DEUTSCHMANN

It is certified that error appears in the above-identified patent and that said Letters Patent are hereby corrected as shown below:

Title page, as it reads now:

[73] Assignee: Motoren-und Turbinen-Union
                          Friedrichshafen GmbH,
                          Stuttgart, Germany Title page as it should read:

[73] Assignee: Motoren-und Turbinen-Union
                          Friedrichshafen GmbH,
                          Friedrichshafen, Germany Signed and Sealed this tenth Day of February 1976

[SEAL]

Attest:

RUTH C. MASON            C. MARSHALL DANN
*Attesting Officer*          *Commissioner of Patents and Trademarks*